(12) United States Patent
Harmon et al.

(10) Patent No.: US 6,810,373 B1
(45) Date of Patent: Oct. 26, 2004

(54) METHOD AND APPARATUS FOR MODELING USING A HARDWARE-SOFTWARE CO-VERIFICATION ENVIRONMENT

(75) Inventors: Bruce Harmon, Portland, OR (US);
Michael Butts, Portland, OR (US);
Gordon Battaile, Beaverton, OR (US);
Kevin Heilman, Sherwood, OR (US);
Levent Caglar, Fremont, CA (US);
Raju Marchala, Palo Alto, CA (US);
Larry Carner, Beaverton, OR (US);
Kamal Varma, Portland, OR (US)

(73) Assignee: Synopsis, Inc., Mountain View, CA (US)

( * ) Notice: Subject to any disclaimer, the term of this patent is extended or adjusted under 35 U.S.C. 154(b) by 831 days.

(21) Appl. No.: 09/637,984

(22) Filed: Aug. 11, 2000

Related U.S. Application Data
(60) Provisional application No. 60/148,822, filed on Aug. 13, 1999.

(51) Int. Cl.[7] ............................................... G06F 17/50
(52) U.S. Cl. ............................... 703/14; 703/25; 716/5
(58) Field of Search ............................... 703/4, 13–25; 716/4–6

(56) References Cited

U.S. PATENT DOCUMENTS

| | | | | |
|---|---|---|---|---|
| 5,768,567 A | * | 6/1998 | Klein et al. ................... | 703/13 |
| 5,838,948 A | * | 11/1998 | Bunza ......................... | 703/27 |
| 5,911,059 A | * | 6/1999 | Profit, Jr. .................... | 703/23 |
| 6,052,524 A | * | 4/2000 | Pauna ......................... | 703/22 |
| 6,212,489 B1 | * | 4/2001 | Klein et al. ................... | 703/13 |
| 6,279,146 B1 | * | 8/2001 | Evans et al. .................. | 716/18 |
| 6,298,320 B1 | * | 10/2001 | Buckmaster et al. .......... | 703/28 |

OTHER PUBLICATIONS

"MPC860 PowerQUICC User's Manual," PowerPC, Motorola, MPC860UM/AD, Rev. 1.

Logic Modeling Corporation, LM Division, "Simulation Integration Manual" Aug. 1992, pp. i–xiii, and pp. 1–208.

Logic Modeling Corporation, LM Division, "LM—Family User's Manual: Hardware Modeler Manual," Sep. 1993, pp. i–xviii and pp. 1–1 to Index–4.

Synopsys, Inc. "LM–1400 Systems, Hardware Modeling System," http address: "www.sysnopsys.com/products/lm/hw_models/lm_1400.htm", Oct. 13, 1997, pp. 1–4.

Synopsys, Inc., "LM–Family Modeler Manual," Mar. 2000, pp. 1–182.

(List continued on next page.)

*Primary Examiner*—Ramesh Patel
*Assistant Examiner*—Crystal J Barnes
(74) *Attorney, Agent, or Firm*—Bever, Hoffman & Harms, LLP; Jeanette S. Harms

(57) ABSTRACT

A method and apparatus for modeling using a hardware-software software co-verification environment is provided. An instruction set simulator is coupled to a simulator circuit to determine if the hardware design is correct. Specifically, the instruction set simulator acts as a "master" to the simulator circuit, thus providing a faster simulation environment. The simulator circuit contains a bus functional model, a hardware model, transfer memory, and the hardware design to be tested. The hardware model is designed to emulate a micro-controller. By disabling a processor within the hardware model, the speed of the simulation is restricted only by the speed of the instruction set simulator or the hardware design. Furthermore, the hardware design may be uncoupled from the simulator circuit in order to initialize the operating system.

27 Claims, 3 Drawing Sheets

OTHER PUBLICATIONS

Synopsys, Inc., "Hardware Models, ModelSource 3000 Series and Options," http address "www.synopsys.com/products/1m/hw_models/hw_systems.htr," Oct. 13, 1997, pp. 1–9.

Applied Microsystems Corp., Co–Verification Presentation Slides, 1988, pp. 2–18.

Carner, Larry & Eaglei HW/SW Co–Verification., "Viewlogic Software Group, Providing Solutions for Embedded Systems,"1997, pp. 1–7.

Bunza, J. Geoffrey, Viewlogic Systems, Inc., "The Magic of Building HW/SW Systems," 1997, pp. 1–143.

* cited by examiner

US 6,810,373 B1

METHOD AND APPARATUS FOR MODELING USING A HARDWARE-SOFTWARE CO-VERIFICATION ENVIRONMENT

RELATED APPLICATION

This application claims priority under 35 U.S.C. § 119(e) of the Ser. U.S. provisional application Ser. No. 60/148,822 filed on Aug. 13, 1999 and entitled "Method and Apparatus for Modelling Using a Hardware-Software Co-Verification Environment." The provisional application Ser. No. 60/148, 822 filed on Aug. 13, 1999 and entitled "Method and Apparatus for Modelling Using a Hardware-Software Co-verification Environment" is also hereby incorporated by reference.

FIELD OF THE INVENTION

The present invention relates to verification of electronic hardware designs. More specifically, the present invention utilizes a logic simulator with a hardware model in combination with an instruction set simulator to create a hardware-software co-verification environment.

BACKGROUND OF THE INVENTION

The use of computer simulation has become widespread in many areas such as circuit design. The cost of manufacturing an integrated circuit is extremely high, and it is desirable that the hardware incorporated into the integrated circuit be tested prior to actual fabrication of the chip. Therefore, integrated circuit manufacturers often use simulators to test the hardware and the software intended to be executed by the hardware.

In performing design verification, it is frequently necessary to simulate not only the newly designed hardware, but also enough of the surrounding electronic environment to provide suitable interface signals to the circuit under test. For this purpose, the engineer creates or obtains a model of a "master" device that can, by way of instructions, manipulate the simulation environment in a desired fashion and produce deterministic results. For example, in order to test a memory chip, an engineer requires a master model to generate functionally and correctly read and write control signals to the chip within the simulation environment. Therefore, the constraints imposed by the instruction set of the master model limit the extent of verification.

A very popular series of microcontrollers have emerged for serial interfaces in the digital communications arena. For example, first in the family was the Motorola 68302 microcontroller. It was replaced over time in terms of the popularity of the Motorola 68360 micro-controller. Then, the Motorola Power PC and MPC860 micro-controller followed. The latest version of the microcontroller is the Motorola MPC8260. Each micro-controller is characterized by a very popular microprocessor core, and contains a series of serial peripherals that are controlled by a common serial communications engine. As a consequence, the micro-controller provides tools to support software development associated with systems that use these particular kinds of chips. A hardware model has been built to match each micro-controller to model portions of the design hardware.

However, a hardware model is not an efficient means by which to develop software. The processor in the hardware model is often a dynamic device that must maintain a running clock in order to retain data. Because the hardware model simulates the system responses event by event for an arbitrarily small time slice, the microprocessor must wait for each simulation cycle to be completed by the hardware simulator. Therefore, the microprocessor must be reset at the start of each simulation cycle, and all the previous vectors rerun. As the simulations gets longer, the time taken to rerun all the previous vectors increases. Executing the software takes a large number of clock cycles, often exceeding the maximum amount of vector memory available for the hardware model, and thus severely limiting the length of the software. In addition to the large memory requirement in the hardware model, the execution of the software at the object code level does not provide a convenient means for debugging the program.

Further, it is not feasible to use a prototype of the hardware design with an evaluation board because that will not allow the customer to do an arbitrary design. Instead, typically the customer's design is based around one of these micro-controllers because the design requires the peripherals of the micro-controller to access the design. The micro-controller has an interface to memory which forms the basis for executing instructions to the serial interface and provides the communications to the hardware design.

Creating a hardware model in a simulator context is previously known. The Synopsys Eaglei@ family utilizes instruction set simulators, bus functional models and other traditional hardware-software co-verification tools for a microprocessor. Synopsys Eaglei @ is a trademark of Synopsys, Inc. of Mountain View, Calif. While the use of a hardware model can provide a full functional processor model, the significant cost of the hardware model is not always reflected by an increase in simulation performance. The hardware model contains a vector memory to store the input data for each pin of the microprocessor for each time slice of the hardware simulator. A time slice can be arbitrarily small, and is typically less than a typical microprocessor clock cycle. The detection of timing problems requires an event by event analysis, including propagation delays of the hardware design. The hardware model runs lockstep with the hardware simulator with the microprocessor generating the next set up binary signals from the vector memory at the microprocessor pin connections for incorporating with the next simulated step of the hardware simulator. Thus, the hardware model operates in complete synchronization with the hardware simulator.

The current problem facing the user is that the standard instruction set simulator tools addressing the processor would not properly address the communication between the peripheral and the design to be tested. Additionally, it is very difficult to make a software model of the entire microcontroller because the modes associated with the multiple peripherals and the different ways they can be configured does not lend itself to modeling very efficiently. It might take years to build a completely accurate sofvare model to accomplish such a task, whereas a hardware model for a microcontroller can be built in much less time, and is intrinsically accurate.

SUMMARY OF THE INVENTION

The present invention in its preferred embodiment represents the ability to model hardware designs that include a microcontroller integrated circuit which has a processor and peripheral devices through the combination of hardware model, instruction set simulator (ISS), and logic simulator within a hardware-software co-verification environment. The present invention accomplishes this goal by breaking the processor away from the peripheral devices, and substituting an ISS so that it can run software with much higher performance. Furthermore, when the peripheral devices' accuracy is an important requirement of the simulation, they can be modeled with perfect accuracy by the hardware model.

In accordance with one aspect of the present invention, the method and apparatus for modeling using this hardware-software co-verification environment comprises a logic simulator program simulating the hardware design, and an ISS for representing the operation of the processor. The logic simulation contains a bus functional model (BFM), a hardware model of an integrated circuit, a remaining hardware design, and an initialization memory block. According to the preferred embodiment, the integrated circuit is a micro-controller.

When the processor of the hardware modeled microcontroller is disabled, the ISS is coupled to the logic simulation in its place. The object is to provide the high speed and internal visibility of the ISS, with the accuracy and easier availability of the rest of the micro-controller modeled in the hardware model. The design process is greatly simplified by not having to generate a software model of the peripheral devices. Additionally, the modeling accuracy is perfect because the actual peripheral devices of the integrated circuit in the hardware model are used.

When the software instruction stream executed by the ISS would cause a bus cycle to be issued by the actual processor, such as for a read or write of external memory or a peripheral devices' register, the ISS send a signal to the BFM, which issues the bus cycle to the rest of the design which is in simulation, including the hardware model. The BFM translates the bus cycle from the command issued by the ISS to the level of pin changes happening in multiple time steps in simulation, as if the actual processor was present.

In accordance with another aspect of the present invention, the processor part of the hardware modeled microcontroller is disabled, even if there is no facility built into the microcontroller integrated circuit to literally turn off. Methods and apparatus of this invention cause the processor part to be effectively disabled, so far as the ISS and the logic simulator are functioning, even if not literally turned off, while retaining complete accuracy.

In accordance with another aspect of the present invention, the ISS is uncoupled from time synchronization with the rest of the design in logic simulation, for example, during periods of little interaction between instruction execution and the peripheral devices of the other hardware, such as while the operating system is initialized. Much faster verification performance results. Furthermore, the instruction stream executed in the ISS may issue bus cycles which access registers in the peripheral devices or the rest of the design while the ISS is uncoupled from logic simulation. The hardware-software co-verification environment of this invention detects such occurrences and temporarily couples the ISS with the logic simulator to correctly execute such bus cycles.

In accordance with another aspect of the present invention, any of the hardware modeled peripheral devices may issue an interrupt request to the processor, which is intercepted by the BFM and passed on to the ISS for servicing, as if the actual processor was present in the logic simulation. Likewise, any of the hardware modeled peripheral devices may issue a direct memory access (DMA) bus cycle, which is intercepted by the BFM and passed on to the rest of the design (ROD) in logic simulation.

The nature, principle and utility of the present invention will become more apparent from the following detailed description when read in conjunction with the accompanying drawings.

Detailed Description of the Present Invention

Figure 1:
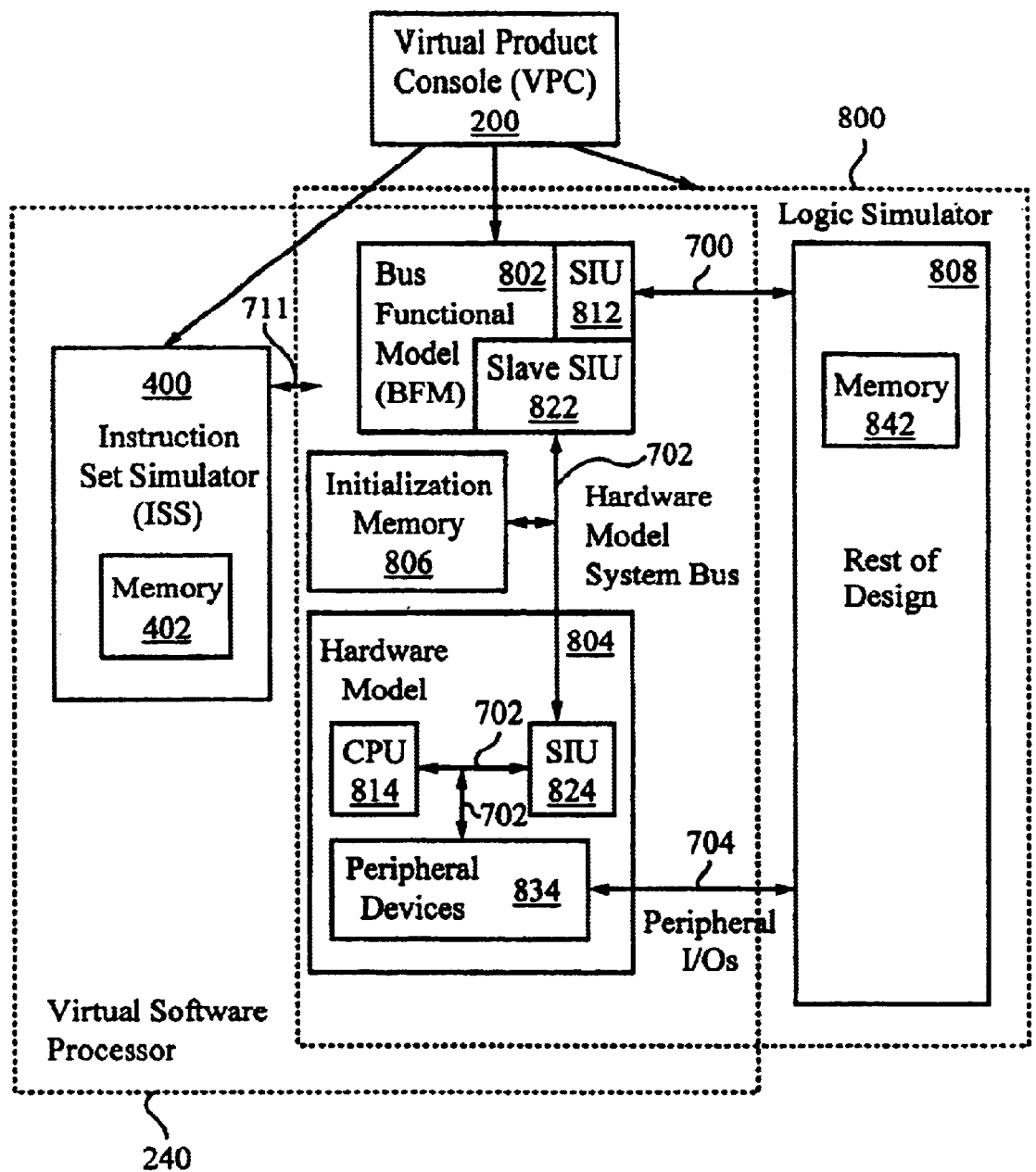
FIG. 1 is a functional diagram of a preferred embodiment of the present invention

Referring to FIG. 1, the present invention includes mainly a virtual product console (VPC) 200, an instruction set simulator (ISS) 400, and a logic simulator 800. The instruction set simulator (ISS) 400 is coupled to the logic simulator 800 via a command path 711.

The VPC 200 is a well-known product in the pertinent hardware/software co-verification market. The VPC 200 provides a hardware/software co-development environment that can simulate both software and hardware views simultaneously. The VPC 200 also let designers test software against the hardware model at behavioral, register, and gate level of abstraction. Accordingly, the VPC 200 controls the ISS 400 and the logic simulator 800.

The ISS 400 is another well-known product in the market. It is an instruction set interpreter- which takes an instruction stream and processes each instruction by decoding the opcode and sending a command or commands out indicating the bus cycles associated with that opcode's execution if any. The ISS 400 accurately simulates the execution of an instruction stream in software, rather than running it on the actual CPU and memory hardware for which it is intended. At any point in the execution of the instruction stream, when the actual CPU would issue an external bus cycle, such as to external memory or a peripheral device, the ISS 400 issues a corresponding bus cycle command to the logic simulator 800 via command path 711. The ISS 400 accurately simulates the execution of software instruction streams, rather than modeling correctly some complete and complex processor functions such as pipelining timing problems. Depending on each application, designers write specific instruction streams and store them in the system memory 402. Further, the ISS 400 contains a software representation of system memory 402 which also has a hardware representation 842. The system memory 402 is not a real memory, but is preferably an abstraction of memory. The ISS 400 works closely with the logic simulator 800 to create a model for a micro-controller.

The logic simulator 800 is a tool for simulating the logical behavior of all hardware components. The logic simulator 800 comprises a Bus Functional Model (BFM) 802, a hardware model 804, an initialization memory 806, and a rest of the design (ROD) 808. The Bus Functional Model (BFM) 802 is a central component of the simulation environment. In this invention, BFM 802 is used to model the bus interface of a CPU without the internal states such as its caches or instruction execution. The BFM 802 contains mainly two system interface units (SIU): a first system interface unit (SRIU 812, and a second system interface unit called a slave SIU 822. In a regular application, a system interface unit (SIU) controls system startup, initialization and operation, protection, as well as external system bus. But in the BFM application, these two SIUs 812 and 822 control two versions of the external system bus. The SIU 812 controls the interface between the BFM 802 with the ROD 808 via the simulated system bus 700. The BFM 802 processes each bus cycle command from the ISS 400 by translating that commnand into pin level signals on simulated system bus 700, which accurately represent the electrical signals that the actual CPU simulated by the ISS 400 would issue. The BFM 802 is connected with the hardware model 804 via the hardware modeled system bus 702 in the logic simulator 800. The hardware model 804 connects with the ROD 808 via the peripheral input/output nets 704. The VPC 200 controls the operation of the ISS 400, the logic simulator 800, and the BFM 802. The VPC 200 handles initialization and provides a graphical user interface for control.

The hardware model 804 of a microcontroller is a conventional and well-known device in the pertinent art. The hardware model 804 is built with an actual hardware integrated circuit microcontroller chip commonly used by designers for design verification and debugging. The hardware model 804 is interfaced with the logic simulator 800 to act as a model of the microcontroller in system simulation, using its internal actual integrated circuit device to provide accurate functional behavior. The microcontroller, modeled by the hardware model 804, is the representative of widely used microcontrollers. The hardware model 804 comprises a CPU 814 that executes an instruction stream during operation, the peripheral devices 834 that provide specialized functionality such as communication ports into and out of the microcontroller, and the SIU 824 that interfaces the CPU 814 and/or the peripheral devices 834 with an external bus for integration of memory and/or other devices external to the microcontroller. The external system bus in the hardware model of this microcontroller is the hardware modeled system bus 702.

Figure 2:
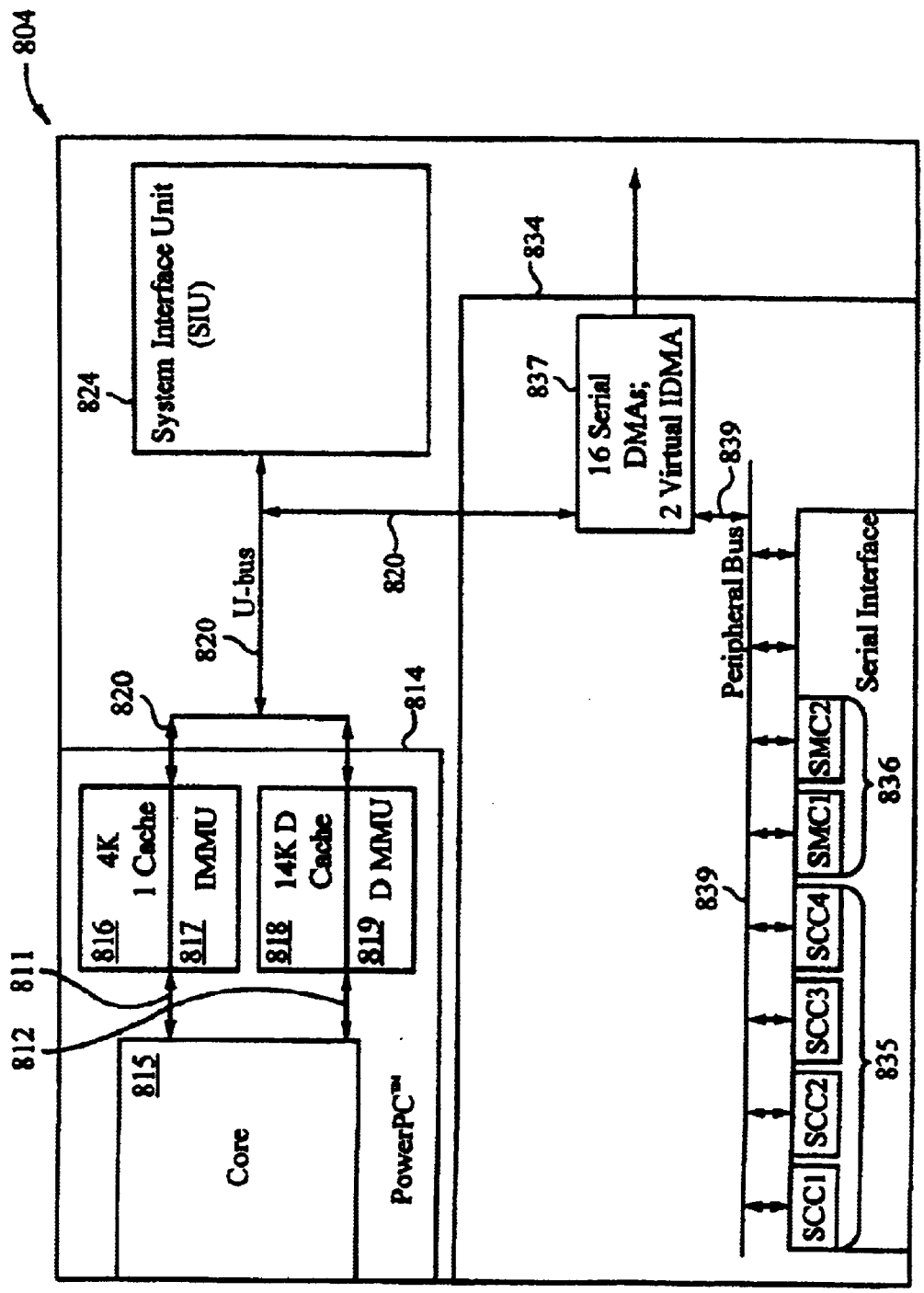
FIG. 2 is a block diagram of the components that comprise the micro-controller in the preferred embodiment of the present invention.

The microcontroller modeled by the hardware model 804 in the preferred embodiment is a Motorola MPC860, whose internal block diagram is shown in FIG. 2. The CPU 814 contains two types of caches: an instruction cache 816, and a data cache 818. A cache memory is another type of memory consisting of fast memory located closest to the CPU and acts as a safe storage to store both instructions and data for the CPU. Both the data cache 816 and the instructions cache 818 have 4-Kbyte of memory and are two-way set associative to allow rapid core access to data and instructions. The CPU 814 also have two types of memory management units (MMU): an IMMU 817 for instructions, and a DMMU 819 for data. These MMUs provide memory management, cache control, memory access protection, and effective-to-physical address translation. The caches 816, 818, and MMUs 817, 819 are connected to a CPU 815 core via the instruction buses 811 for instructions and 812 for the data. These caches and MMUs are of the conventional sort widely used in modem CPUs and are well-known in the pertinent art.

The MPC860's peripheral devices 834 are in the form of a communications processor module (CPM), which contains an array of serial communication controllers (SCC) 835, and serial management channels (SMC) 836, which can conduct a direct memory access (DMA) 837, and other peripheral devices, via a peripheral bus 839 under the local control of a dedicated peripheral microcontroller and program Read-Only-Memory (ROM). The detailed description of the MPC860 is described in the MPC860 Power QUICC User Manual published by Motorola Co., MPC860UM/AD published in July 1998. Any person of ordinary skill in the art can use the manual to program and operate the microcontroller MPC 860 according to the instructions disclosed by the invention. Combining the ISS 400 and the Hardware Model 804 to Form Single Accurate and High Performance Model.

When a software instruction is executed by the ISS 400 that accesses an address in either the peripheral devices 834 or the ROD 808, it issues the bus cycle command to the BFM 802. When the bus cycle command is for an address in the ROD 808, the BFM 802 translates the bus cycle command into pin-level activity on the bus 700. The simulation of the ROD 808 responds to this activity on bus 700. The pin-level hardware response of the ROD 808 is translated back to the command level by the BFM 802, which provides the bus cycle command response to the ISS 400. During this bus cycle command, the SIU 812 manages all commands, accesses, and translations.

When the ISS 400 issues a bus cycle command for an address in the peripheral devices 834, the hardware model 804 models the peripheral devices 834. The BFM 802 translates the bus cycle command into pin level activity on the hardware model system bus 702, driving the hardware model 804 through the separate slave SIU 822 of the BFM 802. Response from the hardware model 804 is translated into the command level by the BFM 802, which provides the bus cycle response back to the ISS 400.

Activity on the peripheral devices 834 is seen directly by both the hardware model 804 and the logic simulation 800 via the peripheral input/output nets 704. When any of the hardware-modeled peripheral devices 834 initiates an activity by issuing an interrupt request, the pin-level activity of the hardware model 804 is detected by slave SIU 822, and is translated into a command for the ISS 400. Likewise, pin-level bus cycle signals on the hardware model system bus 702 are detected by the slave SIU 822 which, in turn, drives the ROD 808 in the logic simulation 800. This activity simulates execution of the DMA cycle.

As a result, the VSP 240 is a simulation model with the speed of operation of the ISS 400 and with the accuracy of the hardware model 804. In normal operation, the logic simulator 800 and ISS 400 must remain coupled (synchronized in simulated time) to insure that all the causeeffect relationships of the signalkevents between the two are preserved and accurately modeled. Then software execution by the simulated system is timing accurate, so hardware and software execution times can be compared. This coupled operation is relatively slow because it is limited by the speed of logic simulator 800.

Higher speed is achieved by coupling the ISS 400 to the logic simulation 800 only during those necessary bus cycles. Thus, the ISS 400 and the logic simulation 800 are not synchronized in time during periods of little interaction between the ISS 400 instruction execution and the peripheral devices 834 or the ROD 808; in particular, when the ISS 400 executes the initialization of the operating system software. As a result, without being held back by the much slower speed of the simulator 800, the ISS 400 can run at its full speed, which may be hundreds of thousands of instructions per second. But during the cycles in which the ISS 400 issues a bus cycle command to a location modeled by an element in the logic simulation 800, the ISS 400 and the logic simulation 800 are temporarily re-synchronized for the duration of the simulation of the bus cycle. Coupling and uncoupling may also be controlled manually by the user through the VPC 200.

Operation When the Hardware Model's CPU Cannot Be Turned Off.

Sometimes the microcontroller chip's CPU 814, used in the hardware model 804 cannot be disabled. Then, substituting the ISS 400 for the hardware model of the CPU 814 would be impossible simply because the hardware model's CPU 814 activity could not be replaced by the activity of the ISS 400. Also, when the microcontroller's peripheral devices 834 are not designed to be controlled from outside the chip through its SIU 824, one ordinarily cannot use the hardware model 804 with the ISS 400 to make the VSP 240, because the ROD 808 would not be able to access the hardware model's peripheral devices 834. Both these limitations exist in the Motorola MPC860 microcontroller of the preferred embodiment.

This invention overcomes these limitations, and makes the hardware/software co-verification environment fully functional and accurate. The method causes the hardware model's CPU 814 to be effectively disabled by causing it to execute an idle loop, while still using it to pass memory access cycles and interrupts between the ISS 400 and the peripheral devices 834 of the hardware model 804.

Figure 3:
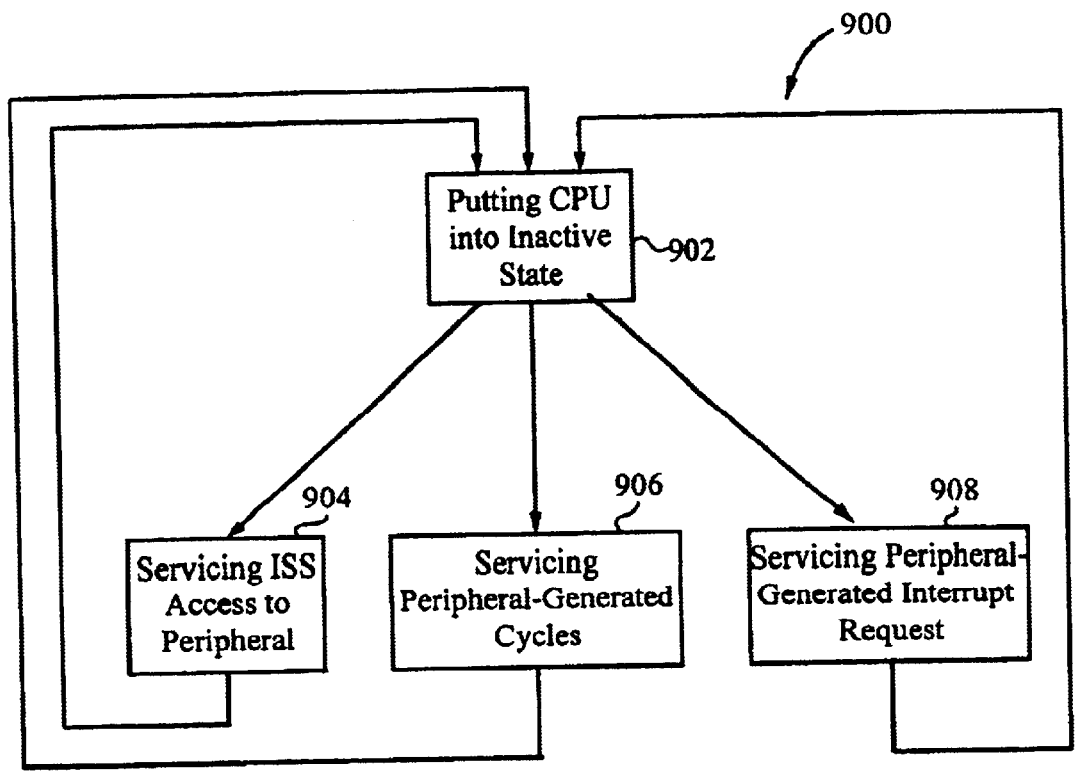
FIG. 3 is a flow chart which illustrates the method of modeling a complex microprocessor.

FIG. 3 illustrates a method 900 of modeling a complex microcontroller. At the step 902, the CPU 814 of the hardware model 804 is put into an effectively inactive state. At the step 904, the memory access from the ISS 400 to device registers in peripheral devices 834 is serviced. At the step 906, the direct mermory access (DMA) 837 cycles generated by peripheral devices 834 are serviced. At the step 908, the interrupt requests generated by peripheral devices 834 are serviced.

Referring to FIG. 3, it should be understood that the steps 902 to 908 are not sequential. After the CPU 814 is put into the inactive state at the step 902, the steps 904 to 908 are independently performed, as appropriate.

In the step 902, the CPU 814 is disabled: when the hardware model 804 is initialized, instruction cache 816 of the CPU core 815 is turned on, fetches and executes a small amount of branching code from the initialization memory 806 which is connected to the hardware model 804 in the BFM 802. This code ends with an idle loop, causing the CPU 814 to continue executing a single cached instruction indefinitely. Since the idle loop is cached internally, it does not generate any activity on the U-bus 820, thus effectively disabling the CPU 814 of the hardware model 804. The initialization code enables the interrupts of the CPU 814 to provide for the following functions, modeled within steps 904 to 908.

During the step 904, when the ISS 400 issues a bus cycle command to access a register in peripheral devices 834, the BFM 802 uses the external interrupt request input (-INTI) of the MPC860's hardware model 804 to conduct a handshake type exchange of signals between the BFM 802 and the hardware model 804 to access peripheral registers. Once the BFM 802 asserts that signal, the CPU 814 of the hardware model 804 executes pre-cached instructions and conducts the requested peripheral register access. This scheme can be achieved in four steps described below:

1) The CPU 814 of the hardware model 804 responds to the external interrupt request of the BFM 802 input by starting an interrupt service routine, which was stored in instruction cache 816 from the initialization memory 806.

2) The interrupt service routine of the hardware model 804 reads a memory location in the BFM 802, which informs it about the memory cycle's address and access type.

3) Then the interrupt service routine of the hardware model 804 executes the access to the peripheral devices 834 by reading or writing data between another memory location in the BFM 802 and in the register of the peripheral devices 834.

4) Finally, the interrupt service routine of the hardware model 804 returns control to the idle loop. The BFM 802 completes execution of the bus cycle command for the ISS 400.

An additional detail addresses the potential race between the interrupt requests generated by the BFM 802 and those generated by the peripheral devices 834. The interrupt pending register (SIPEND) of the MPC860 hardware model 804 is reported to the BFM 802 both at the beginning and at the end of these four steps. This way, if a peripheral-generated interrupt is also pending, it will not be lost when servicing the interrupt from the BFM 802.

In the step 906, to handle accessing the DMA 837 from peripheral devices, when one of the DMA controllers in the peripheral devices 834 issues a memory bus cycle on the U-bus 820, 1110 it passes through the SIU 824 to the external bus pins of the hardware model 804 where the BFM 802 detects it. The BFM 802 passes the pin events onto the ROD 808 in the logic simulation. The logic simulation 800 connects the bus cycle to the hardware memory 842. The Synopsys Eaglei's Direct Memory Interface (DMI) keeps memory coherent between hardware representation 842 in the ROD 808 and software representation 402 in the ISS 400.

During the step 908, when the peripheral device 834 of the hardware model 804 issues an interrupt request, it interrupts the core CPU 814 of the hardware model 804 out of its idle loop. Its interrupt service routine writes the interrupt pending register (SIPEND) into the BFM 802, sending an interrupt request command to the ISS 400. Then the CPU 815 of the hardware model 804 returns to its idle loop.

Alternative Embodiments

It is to be understood that even though various embodiments of the present invention have been set forth in the foregoing description, the above disclosure is illustrative only, and changes may be made in detail, yet remain within the broad principles of the invention.

Other alternative substantially same simulation and modeling tools, methods, and devices widely available in the market, instead of those disclosed in this application such as the ISS, BFM, logic simulation, and hardware model for the MPC860, can be used in a substantially same manner to achieve substantially the same goal as this invention.

Furthermore, the alternative embodiments to the microcontroller MPC860 are other microcontrollers, microprocessors, Application Specific Integrated Circuit (ASIC), and digital signal processing (DSP) devices widely used in the market. Each of the mentioned alternative embodiments can be modeled by the method of this invention, that is, to use the hardware model in combination with the ISS to achieve an accurate, low-cost, and high speed simulation model. When each of the alternative embodiments is used, it is understood that different methods other than those disclosed above result because each device has its own features and behaves differently. The methods resulted from using different alternative embodiment devices are also alternative embodiments of this invention.

Results

Application software is executed by the ISS, at an average speed of at least 100,000 instructions per second, when it is uncoupled from the rest of the VSP and the logic simulation. As with other Synopsys Eaglei VSPs, software can execute coupled or uncoupled with the HW simulation. In uncoupled mode, software execution is not synchronized with operation of the rest of the hardware. The two proceed independently. When software accesses something in the hardware, temporary synchronization takes place to execute the access.

Alternately, the user may select coupled mode, where the ISS is kept in timing lockstep with hardware simulation. Then software execution is timing-accurate, so hardware and software execution times can be compared.

In all cases, the MPC860 peripherals are modeled with full accuracy by the real chip in the ModelSource HW model. The desired combination of software execution speed and hardware accuracy and simulation performance is achieved by this model.

What is claimed is:

1. A system for modeling a hardware design for carrying out an operation wherein the hardware design includes:
   an integrated circuit having including a processor and an internal bus;
   a hardware model containing the integrated circuit;
   a bus functional model employing a first system interface unit and a second system interface unit;
   means for disabling the processor of the integrated circuit, wherein disabling the processor is accomplished by using initialization code to put the processor into an endless loop;
   means for simulating the operation of the processor; and
   means for modeling the internal bus of the integrated circuit and providing signals which would ordinarily appear on the internal bus of the hardware design.

2. The system of claim 1 wherein the integrated circuit is a micro-controller.

3. The system of claim 2 wherein the microcontroller is a Motorola MPC860.

4. The system of claim 1 wherein the first system interface unit of the bus functional model communicates over an external bus to the hardware design, and the second system interface unit of the bus functional model communicates with the hardware model.

5. The system of claim 1 wherein the means for disabling the processor of the hardware model requires the a core of the processor to not issue any bus cycles.

6. The system of claim 1 whereby the endless loop is accomplished by programming the processor to execute out of Cache forever until the processor receives interrupts.

7. The system of claim 1 wherein the means for simulating the operation of the processor is accomplished such that the functional behavior of the system is provided through a combination of hardware and software.

8. The system according to claim 7 wherein at least some of the software-provided functional behavior is provided by the bus functional model.

9. The system according to claim 7 wherein at least some of the software-provided functional behavior is provided by an instruction set simulator.

10. A hardware model including an integrated circuit having a processor and an internal bus, the hardware model including:
    means for disabling the processor by using initialization code to put the processor into an endless loop; and
    means for allowing a direct communication between the a bus functional model and the hardware model to send interrupt service routines without passing through the processor.

11. The hardware model of claim 10 wherein the integrated circuit is a microcontroller.

12. The hardware model of claim 11 wherein the microcontroller is a Motorola MPC860.

13. The hardware model of claim 10 wherein the internal bus of the integrated circuit may be temporarily uncoupled from the hardware design so that initialization of an operating system only communicates with an instruction set simulator.

14. The hardware model of claim 10 wherein the means for disabling the processor of the hardware model requires the core of the processor to not execute any code.

15. The hardware model of claim 10 whereby the endless loop is accomplished by programming the processor to execute out of Cache forever until the processor receives interrupts.

16. A system for modeling a hardware design for carrying out an operation wherein the hardware design includes an integrated circuit having a processor and an internal bus, the system comprising:
    a simulator circuit simulating the hardware design and including the integrated circuit;
    an instruction set simulator for representing an operation of the processor; and
    means for disabling the processor by putting the processor into an endless loop.

17. The system of claim 16 wherein the simulator circuit comprises:
    a hardware model containing the integrated circuit having the processor and the internal bus;
    a bus functional model for interfacing the instruction set simulator to the simulator circuit,
    wherein the simulator circuit can carry out the operation operate without intervention of the processor for determining whether the hardware design is correct; and
    a transfer memory to pass system interrupts between the hardware model and the bus functional model.

18. The system for modeling a hardware of claim 17 wherein the hardware model simulates the integrated circuit by communicating with the bus functional model through a system interface unit.

19. The system of claim 16 wherein the instruction set simulator is external to the simulator circuit and executes interrupt service routines.

20. A hardware model including an integrated circuit, the integrated circuit comprising a processor and an internal bus, the hardware model including:
    means for effectively putting the processor into an endless loop; and
    means for allowing a direct communication between the a bus functional model and the hardware model to send interrupt service routines without passing through the processor.

21. The hardware model of claim 20 wherein the internal bus of the integrated circuit may be temporarily uncoupled from a hardware design so that initialization of an operating system only communicates with an instruction set simulator.

22. A method of modeling an integrated circuit, comprising the following steps:
    putting a central processing unit (CPU) into an inactive state by effectively placing the CPU into an endless loop;
    servicing an instruction set simulator (ISS) access into peripheral devices;
    servicing peripheral-generated cycles; and
    servicing peripheral-generated interrupt requests.

23. The method of claim 22, wherein the integrated circuit is a micro-controller.

24. The method of claim 23, wherein the microcontroller is a Motorola MPC 860.

25. The method of claim 22, wherein the steps are performed independently of each other.

26. The method of claim 22, wherein the steps are performed in any order or simultaneously.

27. The method of claim 22, wherein the peripheral devices are communication processor modules (CPMs).

* * * * *